Figure 1:
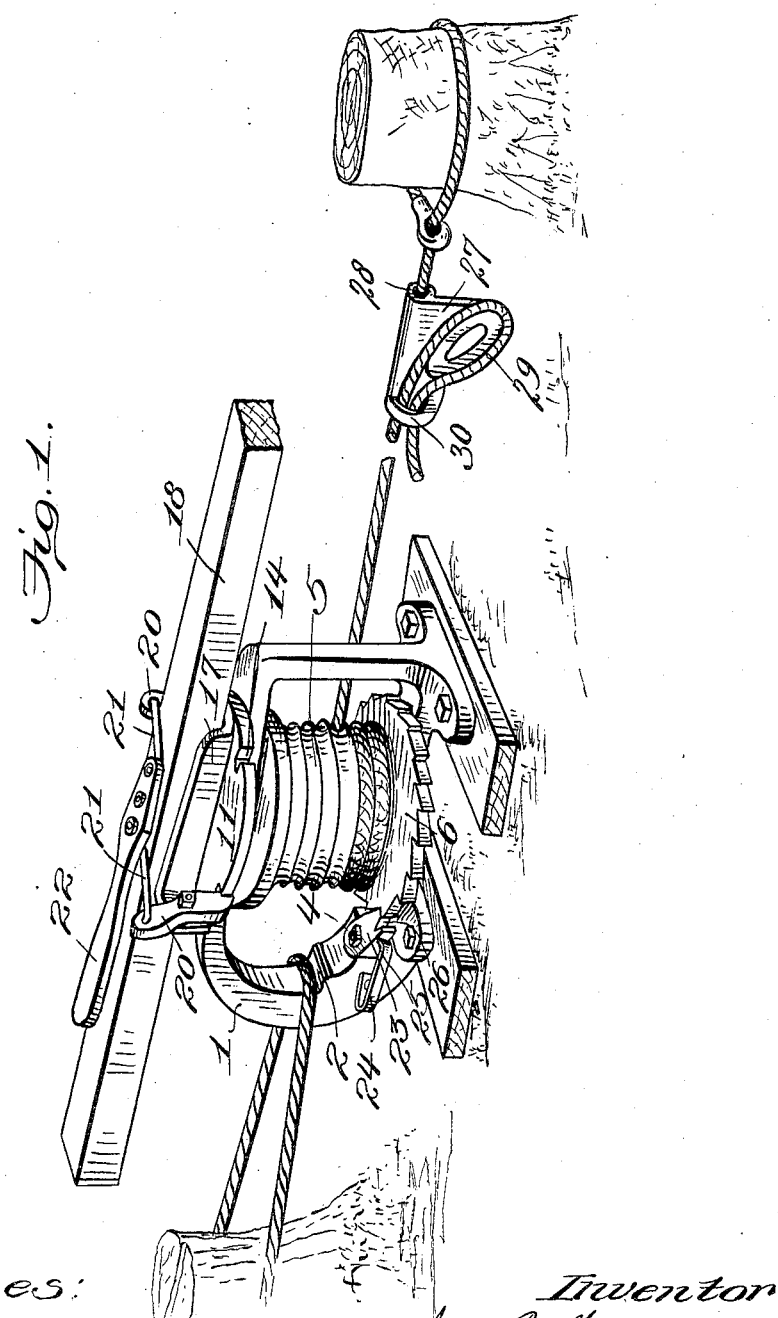

J. C. WILLIAMSON.
STUMP PULLER.
APPLICATION FILED NOV. 19, 1908.

1,057,473.

Patented Apr. 1, 1913.

2 SHEETS—SHEET 1.

Witnesses:
J. D. Kluge.
Fred A. Kluge

Inventor
James C. Williamson
By
Atty.

J. C. WILLIAMSON.
STUMP PULLER.
APPLICATION FILED NOV. 19, 1908.
1,057,473.
Patented Apr. 1, 1913.
2 SHEETS—SHEET 2.
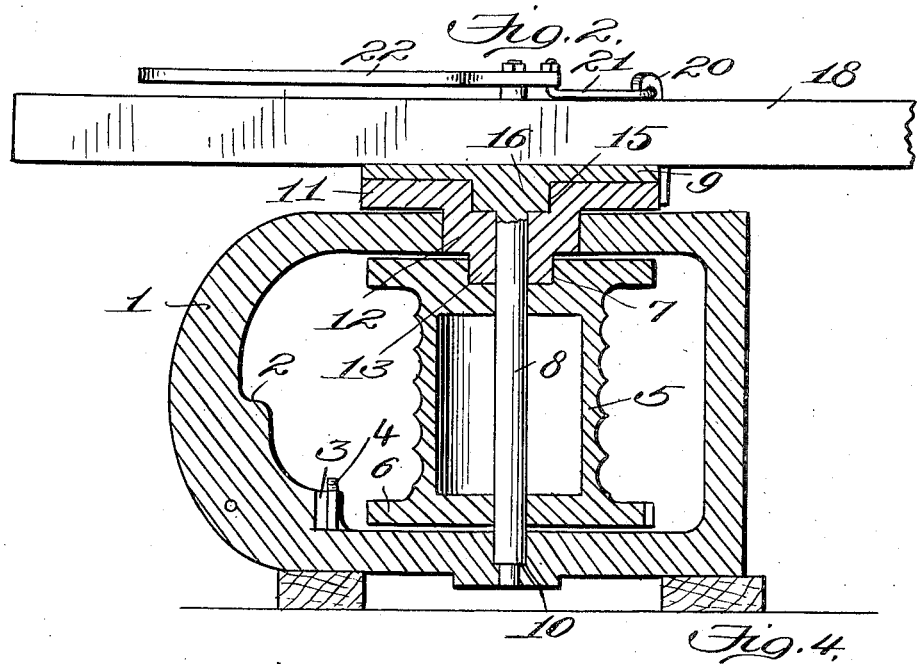
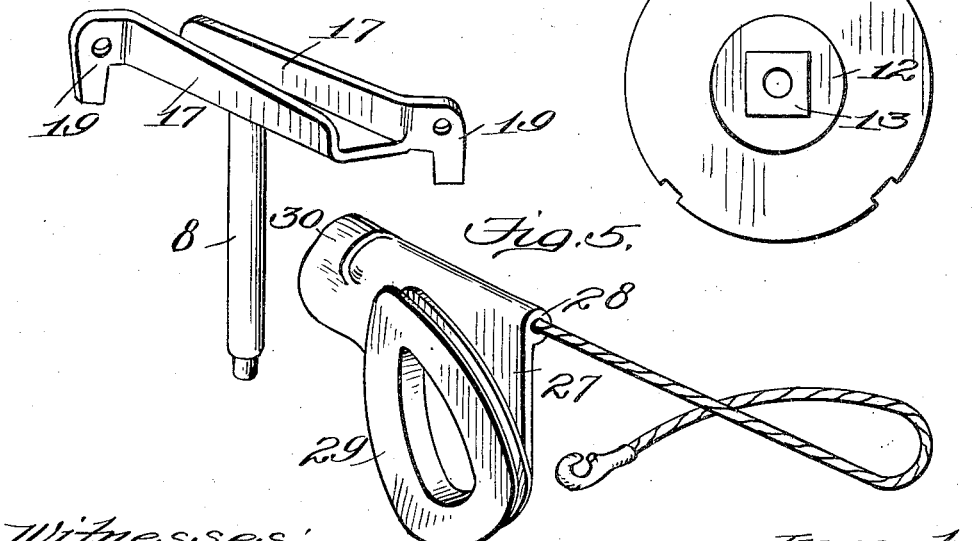
Witnesses:
J. D. Klinge.
Fred G. Klinge
Inventor
James C. Williamson
By
Atty

UNITED STATES PATENT OFFICE.

JAMES C. WILLIAMSON, OF DUDLEY, GEORGIA.

STUMP-PULLER.

1,057,473.                    Specification of Letters Patent.        Patented Apr. 1, 1913.

Application filed November 19, 1908. Serial No. 463,454.

*To all whom it may concern:*

Be it known that I, JAMES C. WILLIAMSON, a citizen of the United States, residing at Dudley, in the county of Laurens and State of Georgia, have invented certain new and useful Improvements in Stump-Pullers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to stump pullers, and the improvements have reference first to the frame on which is mounted the winding drum; secondly, to the winding drum and the toothed or ratchet wheel for holding the same in the frame; thirdly, to the sweep cap and the means for connecting and disconnecting it to and from the drum; fourthly, to a take-up for the draft cable.

To the accomplishment of the foregoing objects, and such others as may hereinafter appear, the invention consists in the features of construction and combination of parts hereinafter particularly described and then sought to be clearly defined by the claims, reference being had to the accompanying drawings forming a part hereof and in which—

Figure 1 is a perspective of the stump puller; Fig. 2 a vertical section through the same; the sweep being in full lines; Fig. 3 a perspective of the sweep seat-cap; Fig. 4 a bottom plan of the clutch-plate; and Fig. 5 a perspective of the cable take-up.

In the drawings, the numeral 1 designates the frame formed in one piece and having a seat 2 formed in one of its upright side members to receive and support the anchor-cable at the proper height above the base and also formed with a recessed seat 3 provided with a journal pin 4 to receive a holding pawl in proper position to engage a ratchet formed on the base of the winding drum.

The numeral 5 designates the winding drum, cast hollow, and having its base formed into a ratchet wheel or disk 6 and with an angular shaped socket or cavity 7 in its top, the drum being placed in position through the open sides of the frame. The drum is journaled in position by a shaft 8 which extends from the under side of a sweep holding seat-cap 9 and passes through the drum and has its lower end seated in a socket 10 formed in the base of the frame.

Between the drum and the sweep holding seat-cap is interposed a clutch plate or disk 11 which has a circular boss 12 fitting in the circular opening in the top of the frame and an angular boss 13 below the circular boss and fitting in the angular recess or socket 7 in the top of the drum so that the clutch disk and drum will rotate together. The periphery of the clutch plate is formed with notches 14, or their equivalent, and on the top of the plate is formed a circular cavity or socket 15. The shaft 8 of the sweep seat-cap passes through the clutch plate and the seat has formed on its under side a circular boss 16 fitting in the circular socket 15 of the clutch plate, and the length of the shaft 8 is such that the seat-cap 9, and its circular boss will rest but very lightly, if at all, on the clutch plate thus allowing the clutch-plate to turn with the drum in unwinding the pull-cable without turning the sweep seat-cap and its sweep. The sweep seat-cap is formed with side flanges 17 which form a socket in which fits the sweep 18 and at opposite corners the cap is formed with shoulders 19, one at each end of the cap, to which are pivoted pawls 20 which engage the notches in the clutch-plate so as to lock together the plate and sweep seat-cap and thus rotate the drum through the clutch-plate in winding up the winding cable.

For the purpose of unclutching the drum and sweep seat-cap when the cable is to unwind from the drum the pawls 20 are connected by links 21 with a hand lever 22 fulcrumed to the sweep 18, said links being connected to the lever on opposite sides of its fulcrum so that when the lever is turned in one direction both pawls will be withdrawn from the notches in the clutch-plate, and then the sweep and drum will be unclutched so that the drum may turn without carrying the sweep with it.

For the purpose of holding the drum against backward rotation as the draft cable is being wound thereon, a pawl 23 is fitted on the journal pin 4 of the seat 3, and is normally pressed into engagement with the ratchet base of the drum by a spring 24 so that the drum can turn in winding the cable but not backward. This spring, which is preferably a leaf spring, has one end curved and the other end formed with a hook 25 designed to engage the end of the pawl, which for that purpose is preferably formed with a notch 26, when the pawl is to be held out of engagement with the drum ratchet in unwinding the cable from the drum.

The winding or draft cable is provided with a take-up which consists of a plate 27 with an eye 28 by which it is attached to the cable and is formed with a peripherally grooved oval shaped boss 29 which extends, preferably, obliquely to the plane of the eye 28, and with a loop or eye 30 at one end of the boss through which the free end of the draft cable passes after making the loop around the boss 29. This take-up is made in one piece and admits of the easy and quick manipulation of the cable in taking-up or lifting out the cable.

The stump puller constructed as described possesses the maximum of strength, with its parts formed so as to be efficient and prompt in action, and without parts liable to be easily broken or disarranged in use.

It is obvious that changes in details of construction of various parts can be made without departing from the essentials of the invention.

Having described my invention and set forth its merits, what I claim is:—

1. In a stump puller, the combination with the frame, of the winding drum, the rotatable clutch plate overlying the top of the frame and formed with an angular-boss fitting a corresponding socket in the drum, the sweep seat-cap provided with a shaft extending through the clutch plate and drum and stepped in the bottom of the frame, and clutch pawls carried by the seat-cap to lock the cap and clutch plate together, substantially as described.

2. In a stump puller, the combination with the frame, of the winding drum, the clutch plate having a notched periphery and formed with a circular boss to rotatably mount the plate in the top of the frame and with an angular boss below the circular boss to fit in a corresponding cavity in the drum to operatively connect together the drum and clutch plate, the sweep seat-cap provided with a shaft passing through the clutch plate and drum, pawls movably mounted on the seat-cap to engage the notches in the clutch-plate, and means for releasing the pawls from locking engagement with the clutch plate, substantially as described.

3. In a stump puller, the combination with the frame, of the winding drum, a clutch-plate mounted in the top of the frame and formed with an angular boss to fit in a corresponding opening in the drum, a sweep seat-cap having a shaft passing through the clutch plate and drum, pawls movably mounted on the seat-cap to have locking engagement with the clutch-plate, and a lever operatively connected with the pawls to release them from locking engagement with the clutch-plate, substantially as described.

4. In a stump puller, the combination with the frame, of the winding drum, the clutch-plate mounted in the top of the frame and connected with the drum to rotate therewith, the sweep seat-cap provided with a shaft passing through the clutch-plate and drum, and having shoulders formed on opposite sides, at opposite ends, pawls pivotally connected to said shoulders and having locking engagement with the clutch-plate, a lever and links connecting the lever with the pawls, said links being connected with the lever on opposite sides of its fulcrum, substantially as described.

In testimony whereof I affix my signature in presence of two witnesses.

JAMES C. WILLIAMSON.

Witnesses:
H. K. O'NEAL,
I. J. DUGGAN.

Copies of this patent may be obtained for five cents each, by addressing the "Commissioner of Patents. Washington, D. C."